(No Model.)
B. C. VAN EMON.
ELECTRICAL STORAGE BATTERY.
No. 524,656.  Patented Aug. 14, 1894.
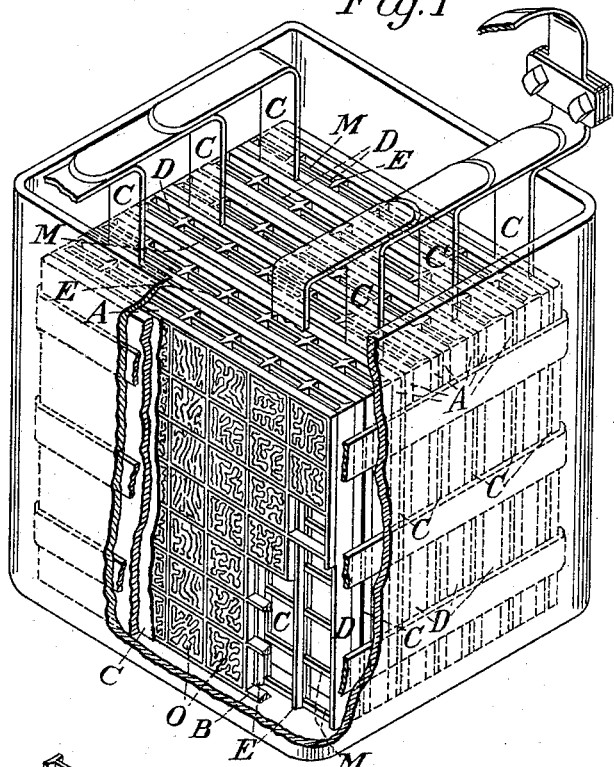
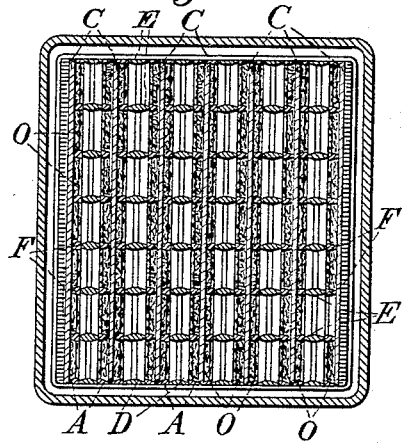
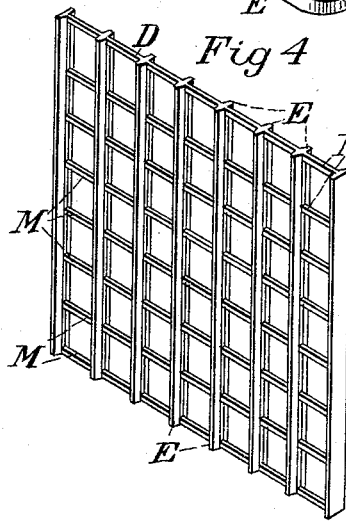
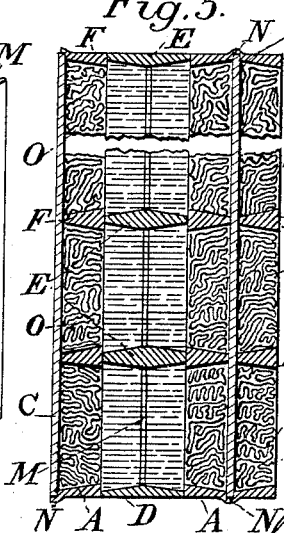
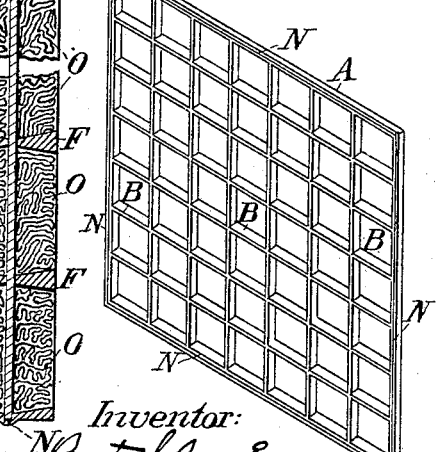
Witnesses:
E. A. Briondau
Wilson D. Bent Jr.
Inventor:
Burton C. Van Emon
By John Richards
Atty

UNITED STATES PATENT OFFICE.

BURTON C. VAN EMON, OF SAN FRANCISCO, CALIFORNIA, ASSIGNOR TO GEO. H. ROE AND GUSTAV SUTRO, OF SAME PLACE.

ELECTRICAL STORAGE-BATTERY.

SPECIFICATION forming part of Letters Patent No. 524,656, dated August 14, 1894.

Application filed November 6, 1893. Serial No. 490,138. (No model.)

*To all whom it may concern:*

Be it known that I, BURTON C. VAN EMON, a citizen of the United States, residing in the city and county of San Francisco, State of California, have invented certain new and useful Improvements in Electrical Accumulator or Storage Batteries; and I hereby declare the following specification and the drawings therewith to be a full, clear, and exact description of my improvements.

My invention relates to what are called storage batteries for accumulating and discharging electricity by means of electrodes, an active material, and electrolyte in which the electrodes are immersed, and a containing cell in the usual form of such batteries.

My improvements consist in protecting the plates or electrodes from direct contact with the electrolyte or liquid solution, and in so disposing and mounting the active material in sections, cubes or otherwise, that the action of the electrolyte or liquid solution in which the plates are immersed, must pass through and not around the active material, and so that the surfaces of contact between the electrode and the active material, as well as between the latter and the retaining grid or agent, will be protected from and impervious to the electrolyte.

The object of my invention is to cause the action in charging and in discharging the battery to pass through a uniform stratum of the active material, by protecting the inner face and also the edges of the sections of active material from the electrolyte, and also in providing for expansion and contraction by means of an elastic indestructible confining grid, preferably made of partially vulcanized india rubber, compressed and fitting closely on the surface and edges of the electrodes or plates, and around the edges of the sections or cubes of the active material, thus protecting the electrodes from sulphating action of the electrolyte, except as such action passes through the active material, thereby adding endurance to the positive electrodes and avoiding renewal.

The method of constructing my improved storage batteries admits of modification in various ways in respect to the division, disposition and protection of the active material, so as to confine the electrolyte to one side thereof, and cause action through a uniform stratum. I have however, in the accompanying drawings, shown what has proven the most successful method of carrying out my invention.

Figure 1 shows an elevation of a storage or accumulator battery made according to my invention, one side of the cell being broken away to expose the plates. Fig. 2 shows a horizontal section through a battery arranged according to my invention. Fig. 3 is a grid or form that sustains and confines the active material in contact with the electrodes and electrolyte. Fig. 4 shows one of the separating forms or plates. Fig. 5 is an enlarged detail showing the position and relation of the several parts when combined.

Similar letters of reference indicate like parts in the different figures of the drawings.

In the construction of such batteries the liquid solution or electolyte permeates all points not perfectly sealed, and owing to the porosity of the active material, commonly peroxide of lead, the pasted joints between this material and the electrode, or the retaining grids or forms, are permeated by the electrolyte, and action is set up on all sides of the active material, causing thereby slow and disturbed action in both charging and discharging the battery. To obviate such action I employ grids or forms A, made of india rubber, or similar elastic material, and a little larger than the immersed portion of the plates or electrodes C, having perforations B, preferably rectangular in form. One of these grids or forms A is placed on each side of the plates or electrodes C, and the perforations B are filled with peroxide of lead, preferably in the form of a paste so it will form a close contact with the plate C, also fill closely the perforations in the forms A. Between the positive and negative plates of the battery thus prepared, I place separating forms D, composed of flexible, non-conducting and non-porous material such as hard rubber or ebonite, having ledges or ribs E extending upward and downward, bearing on the bars F on each side of the perforations B and the active material O, with which these perforations are filled. These vertical bars or ledges E being connected by shallow struts M, an open channel is left from top to bottom equal to the width of the sections or cubes O of the active material, so that the gases evolved by the charging current may more readily escape, and so the electrolyte or liquid solution is free to flow and circulate in contact with the outer faces of the active material O, but is effectually cut off from direct contact with the electrodes or plates C, the thin edges thereof being protected by overlapping of the elastic forms or grids A, as shown at N, in Fig. 5.

In this manner it may be seen that the electrodes or plates A are hermetically sealed against direct action of the electrolyte, and such action has to pass through the cubes or sections O of the active material, the depth thereof, and all other conditions, being the same at all points.

When the required number of positive and negative plates are thus prepared, they are bound together by elastic bands, and placed in a cell containing the electrolyte, as shown in Fig. 1.

Having thus described the nature and objects of my invention, what I claim as new, and desire to secure by Letters Patent, is—

1. In an electric accumulator or storage battery, electrodes or plates in combination with elastic non-conducting and non-porous grids or forms to receive and sustain the active material, overlapping and embracing the electrodes at the bottom and sides; and ribbed separating forms interposed between positive and negative plates, in the manner described, the whole so combined and arranged that the electrodes are protected from contact with the liquid solution or electrolyte in which the battery is immersed, in the manner substantially as shown and described.

2. In an electric accumulator or storage battery, electrodes or plates to which the active material is applied in cubes or sections, one side of which is in contact with the electrode and the other exposed to the electrolyte; these cubes or sections of active material being embraced in and protected at their edges from one another by a grid or form of elastic non-conducting and non-porous material, compressible and expandible so as to seal and protect the edges of the cubes or sections of active material from the action of the electrolyte, in the manner substantially and for the purposes herein set forth.

3. In an electric accumulator or storage battery, electrodes or plates protected on their sides and edges from the liquid solution or electrolyte by means of an elastic non-conducting and non-porous grid or form; separating frames or forms also of non-conducting non-porous material, having ribs or ledges that bear upon the walls of elastic material that contain and confine the active material so as to expose but one side of the latter to the electrolyte, in the manner substantially as described.

4. In an electric accumulator or storage battery, grids or forms of an elastic non-conducting and non-porous material having perforations to receive the active material and bars to separate the same; separating forms or plates provided with ribs or ledges so spaced as to bear upon the bars between the cubes or sections of active material, sealing the edges thereof against the electrolyte and causing the latter to act only through the thin section of the cubes or sections of the active material, substantially in the manner and for the purposes described.

In testimony whereof I have hereunto affixed my signature in the presence of two witnesses.

BURTON C. VAN EMON.

Witnesses:
ALFRED A. ENQUIST,
WILSON D. BENT, Jr.